(12) United States Patent
Cao et al.

(10) Patent No.: US 8,204,985 B2
(45) Date of Patent: Jun. 19, 2012

(54) PROBABILISTIC AGGREGATION OVER DISTRIBUTED DATA STREAMS

(75) Inventors: Jin Cao, Edison, NJ (US); Aiyou Chen, New Providence, NJ (US)

(73) Assignee: Alcatel Lucent, Paris (FR)

( * ) Notice: Subject to any disclaimer, the term of this patent is extended or adjusted under 35 U.S.C. 154(b) by 454 days.

(21) Appl. No.: 12/110,431

(22) Filed: Apr. 28, 2008

(65) Prior Publication Data

US 2009/0271509 A1    Oct. 29, 2009

(51) Int. Cl.
G06F 15/173    (2006.01)
(52) U.S. Cl. ...................................................... 709/224
(58) Field of Classification Search .................. 726/5, 3, 726/1, 27, 24, 23, 22, 2; 709/244, 242, 229, 709/226, 225, 223, 220, 219, 217, 212, 227, 709/206, 203; 370/462, 419, 401, 400, 395.32, 370/390, 389, 363, 351, 338, 256, 237, 232, 370/230, 229; 713/340, 194, 193, 190, 189
See application file for complete search history.

(56) References Cited

U.S. PATENT DOCUMENTS 6,980,521 B1 * 12/2005 Jarvis ............................ 370/238
7,206,861 B1 * 4/2007 Callon .......................... 709/242
2005/0220023 A1   10/2005 Kodialam et al. ............. 370/235
2007/0155396 A1    7/2007 Kim et al. .................... 455/453
2009/0268623 A1   10/2009 Bu et al. ....................... 370/252

OTHER PUBLICATIONS

Zhao, Q. (., Kumar, A., Wang, J., and Xu, J. (. 2005. Data streaming algorithms for accurate and efficient measurement of traffic and flow matrices. In Proceedings of the 2005 ACM SIGMETRICS international Conference on Measurement and Modeling of Computer Systems (Banff, Alberta, Canada, Jun. 6-10, 2005). SIGMETRICS '05. ACM, New York, NY, 350-3.*
Gang Liang; Bin Yu; , "Maximum pseudo likelihood estimation in network tomography," Signal Processing, IEEE Transactions on , vol. 51, No. 8, pp. 2043-2053, Aug. 2003 doi: 10.1109/TSP.2003.814464 URL: http://ieeexplore.ieee.org/stamp/stamp.jsp?tp=&arnumber=1212664&isnumber=27276.*

(Continued)

*Primary Examiner* — Asad M Nawaz
*Assistant Examiner* — Charles Murphy
(74) *Attorney, Agent, or Firm* — Mendelsohn, Drucker & Associates, P.C.; Kevin M. Drucker; Steve Mendelsohn

(57) ABSTRACT

In one embodiment, a method of monitoring a network. The method includes, at each node of a set, constructing a corresponding vector of M components based on a stream of data packets received at the node during a time period, the set including a plurality of nodes of the network, M being greater than 1; and estimating a value of a byte traffic produced by a part of the packets based on the constructed vectors, the part being the packets received by every node of the set. The constructing includes updating a component of the vector corresponding to one of the nodes in response to the one of the nodes receiving a data packet. The updating includes selecting a component of the vector to be updated by hashing a property of the received data packet.

24 Claims, 5 Drawing Sheets

OTHER PUBLICATIONS

Zhao, Q. (., Kumar, A., Wang, J., and Xu, J. (. 2005. Data streaming algorithms for accurate and efficient measurement of traffic and flow matrices. In Proceedings of the 2005 ACM SIGMETRICS international Conference on Measurement and Modeling of Computer Systems (Banff, Alberta, Canada, Jun. 6-10, 2005). SIGMETRICS '05. ACM, New York, NY.*

Cai et al., "Fast and Accurate Traffic Matrix Measurement Using Adaptive Cardinality Counting," ACM. Proceedings of the 2005 ACM SIGCOMM workshop on Mining Network Data, Aug. 22-26, 2005, pp. 205-206.

Durand, M. and Flajolet, P. "Loglog Counting of Large Cardinalities." Springer-Verlag Berlin, 2003, pp. 605-617.

* cited by examiner

PROBABILISTIC AGGREGATION OVER DISTRIBUTED DATA STREAMS

CROSS-REFERENCE TO RELATED APPLICATIONS

This application is related to U.S. application Ser. No. 12/110,380, filed on the same date as this application, the teachings of which are incorporated herein by reference.

BACKGROUND OF THE INVENTION

1. Field of the Invention

The present invention relates to traffic analysis in a network.

2. Description of the Related Art

A database is a collection of information. Relational databases are typically illustrated as one or more two-dimensional tables. Each table arranges the information in rows and columns, with each row corresponding to a record and each column corresponding to a field. In a relational database, a collection of tables can be related or joined to each other through a common field or key, which enables information in one table to be automatically cross-referenced to corresponding information in another table.

A complex search may be performed on a database with a query. A query specifies a set of criteria (e.g., the quantity of parts from a particular transaction) to define identified information for a database program to retrieve from the database. An aggregate query is a query that requests information concerning a selected group of records. For example, in a database which stores sales transactions, an aggregate query may request the total quantity of an item in a particular transaction. Each aggregate query may include a set of criteria to select records (e.g., grouping of records by an item code field and a transaction code field), and an operation to perform on the group of selected records (e.g., summing the quantity fields). Typical operations for aggregate queries include counting, summing, averaging, and finding minimum and maximum values.

To perform an aggregate query, a conventional database program examines every record in the database to determine whether or not the record matches any criteria and constructs a query table from the records that match the criteria. Then the program performs the required operation over the appropriate fields from each record in the query table.

Massive data streams are increasingly prevalent in many real-time applications, such as web applications, Internet-traffic monitoring, telecommunication-data management, financial applications, and sensor networks. Often, the data streams in these applications are distributed across many locations, and it is important to be able to answer aggregate queries that pool information from multiple locations. Given continuous data feeds to support real-time decision making in mission-critical applications, such as fraud and anomaly detection, these queries are typically evaluated continuously, in an online fashion. For example, in a high-speed network with many nodes, packet streams arrive at and depart from the nodes on a continuous basis. A quantity that is of importance for many network-management applications, such as optimization and fault management, is a traffic matrix, which is a representation of the volume of traffic (typically in packets or bytes) that flows between origin-destination (OD) node pairs in a communication network during a measurement interval. A traffic matrix varies over time, and a sudden change may indicate an underlying anomaly.

In some circumstances, such as the monitoring of network traffic that includes high-speed and/or high-volume data streams, aggregate querying, as performed by conventional database programs, may be unacceptably slow. In such circumstances, exact computation for aggregate queries can be difficult to carry out, due to large memory requirements.

The term "set expression" refers to an expression that defines a set of data elements and is made up of set identifiers (i.e., names of sets) and set operations (such as complements, unions, intersections, and differences) performed on those sets. Each data element may be, e.g., an individual byte of data or a record containing multiple bytes of data. The terms "stream expression" and "data stream," as used herein, refer to a set expression defined over multiple streams (such as streams of data passing through different nodes of a network), where each stream is considered as a set of elements. Since, in a given stream expression, elements may appear more than once, the term "stream-expression cardinality" refers to the number of distinct elements in a stream expression.

For example, in the Venn diagram of FIG. 3, where $T_1$ and $T_2$ represent two different stream expressions, the cardinality of $T_1$ is 1 (i.e., $T_1$ contains 1 distinct element), and the cardinality of $T_2$ is 2 (i.e., $T_2$ contains 2 distinct elements). The cardinality of the stream-intersection set $T_1 \cap T_2$ is 0, since there are no elements common to both $T_1$ and $T_2$, and the cardinality of the stream-union set $T_1 \cup T_2$ is 3.

SUMMARY OF THE INVENTION

In one embodiment, the present invention provides a method of monitoring a network. The method includes, at each node of a set, constructing a corresponding vector of M components based on a stream of data packets received at the node during a time period, the set including a plurality of nodes of the network, M being greater than 1; and estimating a value of a byte traffic produced by a part of the packets based on the constructed vectors, the part being the packets received by every node of the set. The constructing includes updating a component of the vector corresponding to one of the nodes in response to the one of the nodes receiving a data packet. The updating includes selecting a component of the vector to be updated by hashing a property of the received data packet.

DETAILED DESCRIPTION

Embodiments of the present invention will now be discussed in further detail in the following sequence.

First, a Quasi-Maximum Likelihood Estimation (QMLE) estimator of the aggregate query will be proposed, which is near-optimal in terms of statistical efficiency, without requiring any prior knowledge of the actual distribution of the attribute values to be aggregated. Such a QMLE estimator constructs and employs, for each of the two data streams, vectors of M components, where M>1. The vectors are compact representations of the actual elements in the streams. The near-optimality implies that algorithms consistent with embodiments of the invention can yield highly accurate estimates given a small amount of memory. A QMLE estimator is also scale-free, in the sense that the approximation error of the estimator is independent of unknown data-stream volumes.

Second, a new vector-generating algorithm for approximately answering aggregate queries over two data streams will be presented.

Theoretical analysis has shown that, with the same memory requirement, this approach has superior performance to those of the prior art, and the relative error of a QMLE estimator scales linearly with the square root of the noise-to-signal ratios, while prior-art approaches scale linearly with noise-to-signal ratios.

Figure 1:
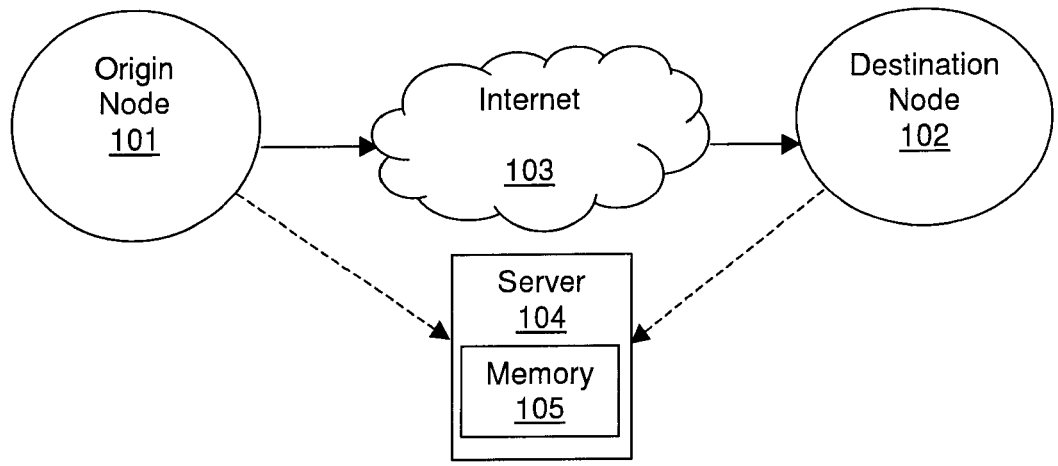
FIG. 1 is an exemplary block diagram for a portion of a network implementing a method consistent with one embodiment of the present invention.

An embodiment of a QMLE scheme is a traffic-matrix estimation problem in a high-speed network, where the objective is to accurately estimate total traffic volume (e.g., in bytes) between origin and destination nodes in the network, using byte streams observed at individual nodes. This embodiment may be used in the system of FIG. 1. In that system, data streams travel from an origin node 101 to a destination node 102 via the Internet 103. A first stream $\tau_1$ consists of bytes passing through origin node 101, and a second stream $\tau_2$ consists of bytes passing through destination node 102. Each of nodes 101 and 102 generates and provides a vector of M components, where M>1, to server 104, which uses the vectors to generate a QMLE estimate, i.e., an estimate of the number of bytes in these data streams. Server 104 includes a memory 105 (e.g., a hard disk or RAM device) that contains machine-readable instructions for generating the QMLE estimate. This QMLE estimate characterizes the amount of traffic between origin node 101 and destination node 102 and can be used by server 104 for various traffic-monitoring or routing purposes. For example, server 104 might send messages to one or more nodes in the network (not shown) to admit new bytes into the network at origin node 101 or to deny entrance to such new bytes, depending on the whether the amount of traffic indicated by the QMLE estimate (i.e., an unusually large amount of traffic) indicates a potential traffic anomaly, such as a denial-of-service (DoS) attack.

Figure 2:
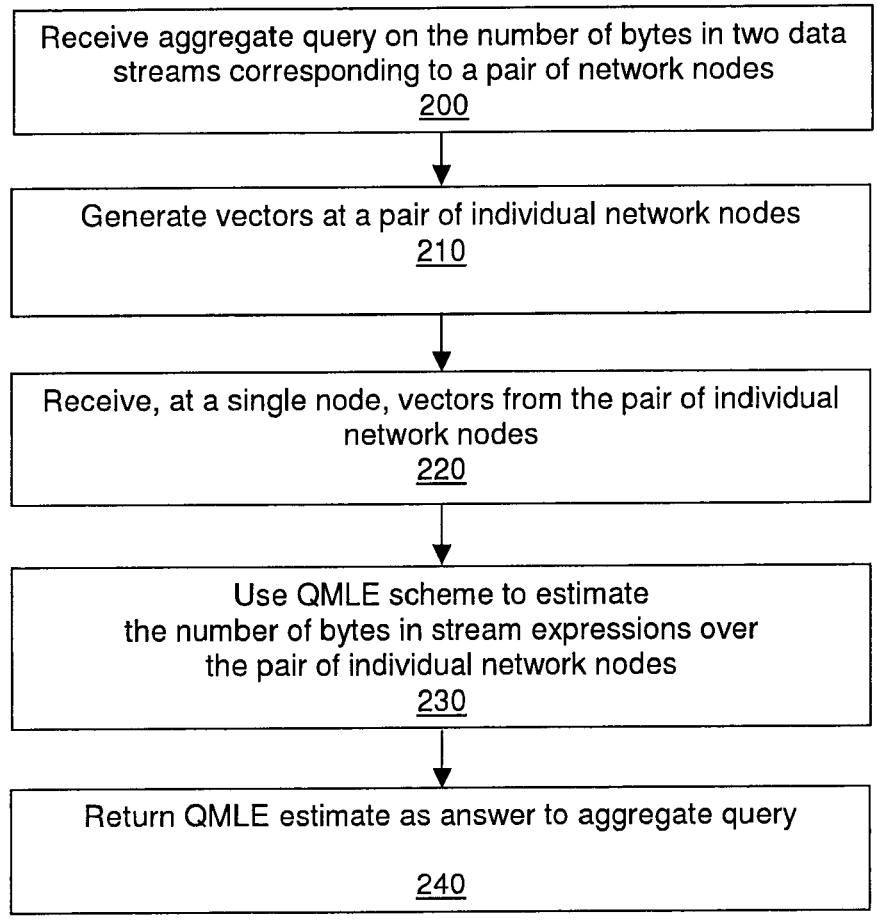
FIG. 2 is a flowchart of an exemplary method for answering an aggregate query on the number of bytes in two data streams corresponding to a pair of network nodes, by using a Quasi-Maximum Likelihood Estimation (QMLE) estimator.
Figure 3:
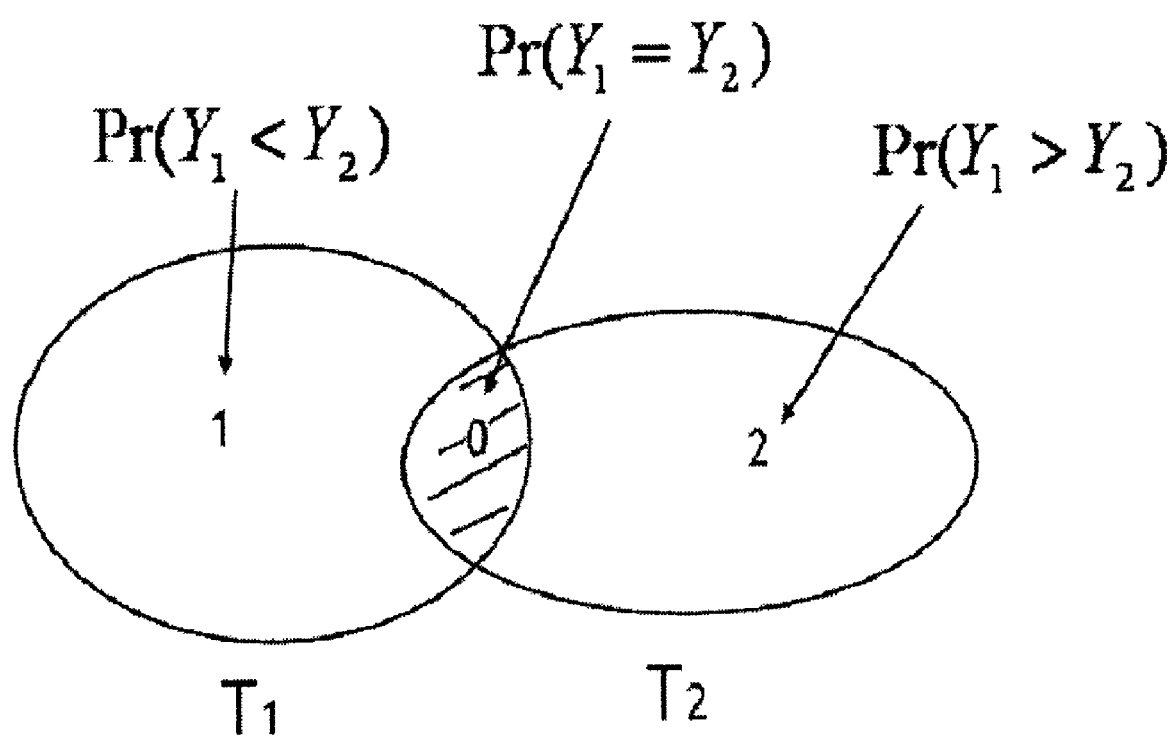
FIG. 3 is a Venn diagram illustrating proportions of set-expression cardinalities for a two-stream set expression.
Figure 4:
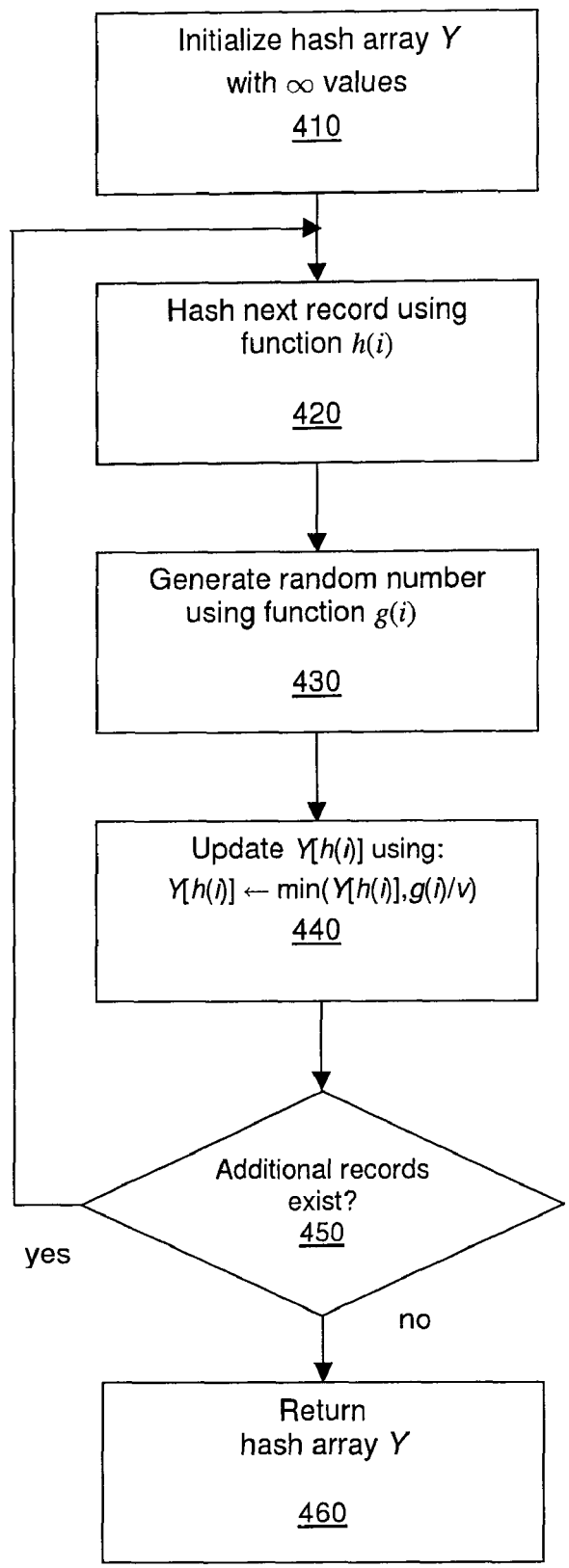
FIG. 4 is a flowchart illustrating a method for vector generation for sum queries, consistent with one embodiment of the present invention.

FIG. 2 shows an embodiment of a method for answering an aggregate query on the number of bytes in two data streams corresponding to a pair of network nodes, using a QMLE estimator. First, at step 200, the aggregate query is received. At step 210, vectors are generated at a pair of individual nodes in the network (e.g., as shown in the flowchart of FIG. 4, which will be discussed in further detail below. Step 210 can be carried out, e.g., according to Algorithm 1, below. Next, at step 220, the vectors from the pair of individual nodes in the network are all received at a single node (e.g., server 104 of FIG. 1). This receiving step may be the result of one or more queries from the single node, or alternatively, the vectors may automatically be provided by the individual nodes. At step 230, a QMLE scheme consistent with one embodiment of the invention, as will be described in further detail below, is used to estimate the number of bytes in stream expressions over the pair of individual nodes in the network, i.e., QMLE estimate is generated by applying one or more set operations to the vectors corresponding to the stream expressions. Step 230 can be carried out, e.g., by methods based on Statement 1 and Equation (11), below. Lastly, at step 240, the QMLE estimate of the number of bytes is returned as the answer to the aggregate query. This estimate can then be used, e.g., to identify potential traffic anomalies in the network. While exact computation for aggregate queries can be difficult, an attractive alternative solution is to yield approximate answers that can provide probabilistic guarantees of approximation errors. For the solution to be viable, approximation algorithms should be designed with small memory requirements and a small per-data record-processing overhead that can achieve reasonable accuracy for approximate query-answering.

For a pair of high-volume data streams, each record in the stream is composed of an identifier and value pair, (i, v), where each identifier i is unique in each data stream, and v has a finite variance. In practice, such a constraint on attributes (i, v) is satisfied or approximately satisfied in many situations. For example, in the traffic-matrix estimation problem, duplicate packets constitute a very small percentage of the total traffic (typically less than 2%), and packet sizes are bounded, usually between 1 and 1500 packets.

Embodiments of the present invention provide schemes for providing approximate answers to aggregate queries (e.g., sum queries, count queries, and average queries) of v over the pair of data streams in a time interval, using the identifier i as the equi-join attribute (a value for i that is compared based only on whether or not it is equal to another value i from a different record). Such schemes are based on vectors, each vector being a compact synopsis that can be generated, for each data stream, with little processing overhead. If a sum query is being answered, and v is always positive, then such schemes can be generalized to other situations.

Each vector is a hash array of size M generated as follows. For each incoming record (i, v) in the stream, the record is first hashed to a bucket using its identifier i as a hash key, and then a value g(i) is computed, where g(•) is a unit-exponential random-number generator using i as its seed value. Each bucket then stores the minimum value of g(i)/v for all records hashed to the bucket. At the end of each measurement interval, the vectors for both data streams are routed to a centralized location, where an accurate estimate of the sum query is obtained using a QMLE method, as will be described in further detail below. Such algorithms are scale-free in the sense that, for a given level of approximation accuracy, M is independent of unknown data-stream volumes.

A feature of certain embodiments of the present invention is the development of a likelihood-based inference, based on a new statistical model of vectors. As a result, estimates are generated that are highly efficient and scale well with high noise-to-signal ratios. Furthermore, an accurate approximation of the distribution of relative-estimation error can be derived, which provides a much more informative characterization of the error distribution than loose probability bounds.

While other solutions for count-query computation over data streams have previously been proposed based on hashing and extreme values of a randomization function applied to each data stream, in embodiments of the present invention, the distribution of v is unknown in advance, and hence, the distribution of the hash-array values for the vector-generating algorithm is not exactly known. QMLE methods consistent with embodiments of the present invention account for this uncertainty and yield near-optimal estimates in terms of statistical efficiency.

The following additional notations will be used herein. The expression P(•) represents a probability function. The expressions E(•) and var(•) represent the expectation and variance of a random variable, respectively. The expressions corr(•,•) and cov(•,•) represent correlation and covariance, respectively, between two random variables, and the expression $$\xrightarrow{d}$$

represents a convergence in distribution. The expression $\doteq$ means a definition, and the expression a≈b is equivalent to a/b≈1, where the operator ≈ represents an approximation of equality. The operators $\cup$, $\cap$, and \ represent set union, set intersection, and set difference, respectively.

An introduction to the problem, including a streaming algorithm for vector generation of an individual stream, will now be provided.

The expressions $\tau_1$, $\tau_2$ represent two data streams, where each element is composed of an identifier and value pair (i, v). Assuming that there is no duplicate identifier i in each of the data streams in a given time interval, and that the attribute value v has a finite variance (the finite variance assumption is satisfied, e.g., if v is bounded), approximate answers are sought for:

$$V = \Sigma_{(i,v) \in \tau_1 \cap \tau_2} v \text{(sum query)},$$

$$C = \Sigma_{(i,v) \in \tau_1 \cap \tau_2} 1 \text{(sum query)},$$

$$A = V/C \text{(average query)}. \quad (1)$$

Here, $\tau_1 \cap \tau_2$ denotes the intersection of $\tau_1$ and $\tau_2$. In exemplary database language, the expressions V, C, A represent the result of aggregate queries for attribute value v of the equi-join of two data streams $\tau_1$, $\tau_2$ using identifier i.

Of particular interest is a scenario in which $\tau_1$, $\tau_2$ are of very high volume, e.g., containing millions or even billions of records. A highly accurate and scale-free estimate is desirable, where "scale-free" implies that the approximation errors of the underlying algorithm are independent of unknown volumes. A vector-generating algorithm consistent with embodiments of the invention is applied to each data stream to achieve this goal. A vector-generating algorithm designed to answer the sum queries will first be presented, and then the cases of the count query and average query will be discussed.

Without the loss of generality, it is assumed that attribute value v is always positive (zero values of v can be ignored, since such values do not contribute to the sum). If one or more v values are not positive, then the values of v can always be divided into two groups, one for the positive values of v, and one or the negative values of v, and a single sum query will then be converted into two sum queries, one for the positive values of v, and the other for the negative values of v.

As shown in the flowchart of FIG. 4, for each data stream $\tau$, a vector is generated and stored in a hash array Y= $(Y[1], \ldots, Y[M])^T$ of size M using the following method. First, at step 410, at the start of the measurement interval, all hash-array buckets are initialized with values of $\infty$. At step 420, an incoming record (i, v) is hashed to bucket h(i) using identifier i as the hash key, where h(•) is a uniform hashing function generating values from 1 to M. Next, at step 430, g(i) is computed, where g(•) is a unit-exponential random-number generator using i as its seed. It is noted that h(i) and g(i) can be computed in parallel. At step 440, the current bucket then stores the minimum value of g(i)/v for all records hashed to the bucket, i.e., an update of Y[h(i)] is performed using Y[h(i)]←min(Y[h(i)],g(i)/v). At step 450, a determination is made whether additional records exist, in which case the method returns to step 420. If, at step 450, it is determined that no additional records exist, then the method proceeds to step 460, wherein hash array Y is returned as a result. A bucket value will remain at $\infty$ if no record is hashed to the bucket. The following exemplary pseudo-code (Algorithm 1) may be used to implement the foregoing algorithm, which is executed for both data streams independently, using the same functions h(•) and g(•).

---
Algorithm 1: Online sketch generation for Sum Queries
---
1: Initialize a hash array Y of size M with values $\infty$;
2: for each incoming record (i,v) do
3:   update Y[h(i)] = min(Y[h(i)], g(i)/v)
4: Return Y at the end of each measurement interval.
---

In Algorithm 1, steps 1, 2, 3, and 4 correspond to steps 410, 450, 440, and 460 of FIG. 4, respectively, as described above.

The expression N represents the total number of records in stream $\tau$, and $\lambda$=N/M represents the average number of records in each bucket. For the kth bucket, $1 \leq k \leq M$, if there are $B_k$ records hashed into the bucket, i.e., $(i_{k,l}, v_{k,l})$, $l=1, \ldots, B_k$, and for each record $(i_{k,l}, v_{k,l})$, $l=1, \ldots, B_k$, the expression $R_{k,l} = g(i_{k,l})$, then $$Y[k] = \begin{cases} \infty & \text{if } B_k = 0, \\ \min\{R_{k,l}/v_{k,l} : l = 1, \ldots, B_k\} & \text{if } B_k \geq 1. \end{cases} \quad (2)$$

Now, if $$V_k = \sum_{l=1}^{B_k} v_{k,l}, \quad (3)$$

is the total sum of attribute values in bucket k, and it is assumed that attribute value v is always positive, then it can be seen that, when $B_k \geq 1$, $$\min\left\{\frac{R_{k,l}}{v_{k,l}} : l = 1, \ldots, B_k\right\} \stackrel{d}{=} \frac{R_k}{\sum_{i=1}^{B_k} v_{k,l}} = \frac{R_k}{V_k},$$

for some values of $R_k$, which is a unit-exponential random variable. Therefore, the following equation for Y[k] can be derived:

$$Y[k] = \begin{cases} \infty & \text{if } B_k = 0, \\ R_k/V_k & \text{if } B_k \geq 1, \end{cases} \quad (4)$$

where $R_k$ is a unit exponential, and $V_k$ follows Equation (3) shown above.

Since the attribute values are not stored in hash array Y[k], $1 \leq k \leq M$, the exact distribution of Y[k] is unknown. However, an approximate distribution of Y[k] when $\lambda$ is large can be obtained as follows. If v is a random variable generated from an unknown distribution F with mean v and variance $\kappa v^2$, and $\kappa$ is the ratio of variance-to-mean square, i.e., the square of the coefficient of variance, then it can be seen that $B_k$ follows a binomial distribution Binomial(N, 1/M), which is approximately a Poisson discrete-probability distribution Poisson($\lambda$) for large values of N, M. It can be shown that $$E[V_k] = \lambda v, \text{Var}[V_k] = (1+\kappa)v^2. \quad (5)$$

and it can be further verified that, as $\lambda \to \infty$, almost surely, $$\frac{V_k}{\lambda} \to v,$$

and in distribution, $$\frac{V_k - \lambda v}{\sqrt{\lambda}} \to \mathcal{N}(0, (1+\kappa)v^2). \quad (6)$$

Therefore, Y[k] approximates an exponential distribution with rate $\lambda v$. It is further noted that the values of $R_k$, k=1, . . . , M, are independent, and the values of $B_k$, k=1, . . . , M, are approximately independent when N, M are large, and hence, the values of Y[k], $1 \leq k \leq M$, are approximately independent. The following Lemma 1 states a mathematical relationship characterizing the statistical properties of Y[k]:

Lemma 1: When N, M, $\lambda$ are large. Y[k], $1 \leq Y \leq M$ are approximately independent exponential random variables with rate $\lambda v$.

An improved approximation to distribution Y[k] can be obtained using a Gamma distribution, as disclosed in Johnson et al., *Continuous Univariate Distributions, Vol.* 2, Wiley Series in Probability and Statistics, 1995, which is incorporated herein by reference in its entirety, instead of using a constant as in Lemma 1, to approximate the distribution of $V_k$ in Equation (3), i.e., $$V_k \approx \text{Gamma}(\alpha, \beta), \quad (7)$$

where $\alpha$ is a shape parameter and $\beta$ is a scale parameter of the Gamma distribution. A sum of independent random variables $V_k$ can be approximated using a Gamma distribution with a large shape parameter, as well as a Normal distribution. However, the Gamma distribution is positive and the Normal distribution is not, and therefore, a Gamma approximation is more desirable in practice. By equating the first and second moments of the Gamma distribution with those of $V_k$, it can be seen that the shape and scale parameters $(\alpha, \beta)$ of the Gamma distribution approximation are $$\alpha = \frac{\lambda}{1+\kappa}, \beta = v(1+\kappa). \quad (8)$$

Using the traffic-matrix estimation problem as an example in simulations, it has been shown that the Gamma distribution provides a good approximation for $\lambda$, even when $\lambda$ is as small as 5.

It might be assumed that $V_k$ follows a Gamma distribution with shape $\alpha$ and scale $\beta$. However, since this assumption might not be exactly true, the variables $P_Q$ and $E_Q$ will be used to denote the probability and expectation, respectively, based on this assumed distribution for $V_k$, which will be referred to as a "quasi-likelihood" method. Then, by using the characteristic function of the Gamma distribution, the following equation holds true:

$$P_Q(Y[k] \geq y) = E_Q[e^{-yV_k}] = (1+\beta y)^{-\alpha}.$$

In other words, Y[k] follows a generalized-Pareto distribution Pareto($\alpha, \beta$).

Figure 5:
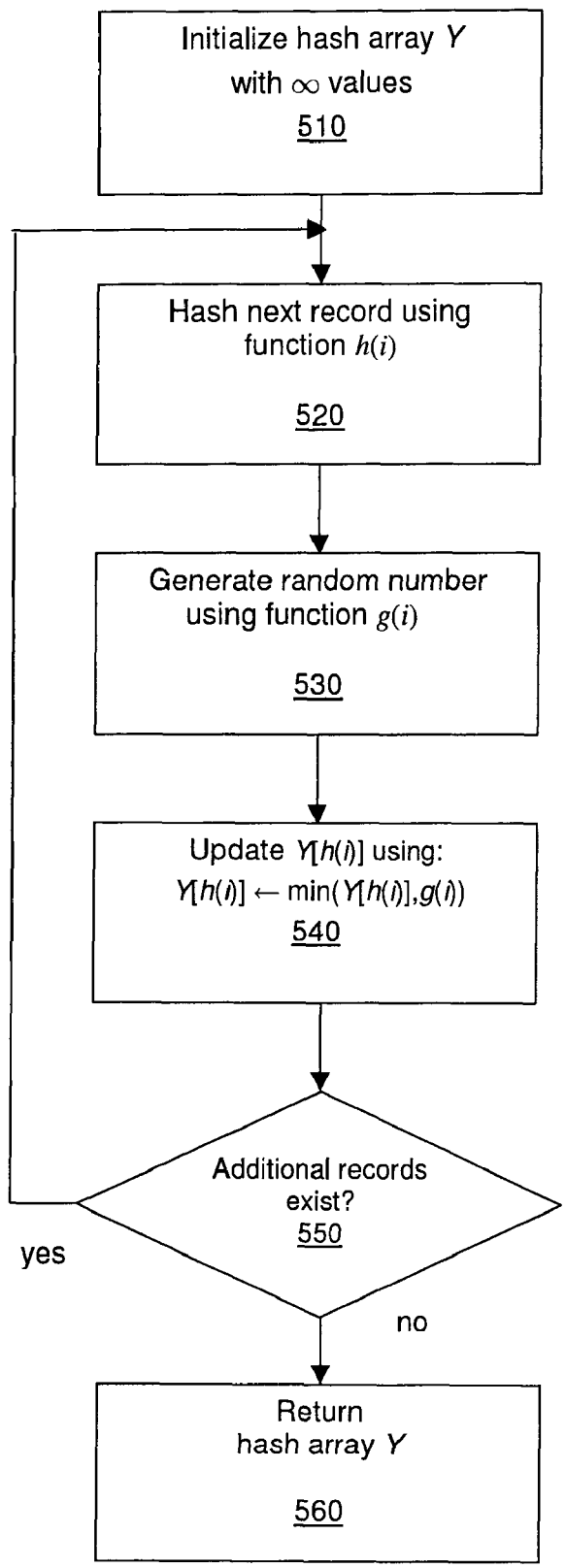
FIG. 5 is a flowchart illustrating a method for vector generation for count queries, consistent with one embodiment of the present invention.

The cases of the count query and average query will now be discussed. A count query returns a cardinality, e.g., the number of records (or, in other embodiments, bytes) in a data stream. To provide an approximate answer for the count query in Equation (1), a hash array can be designed for each stream, in a manner similar to Algorithm 1, by replacing v with a constant value of 1. This has been proposed in the prior art, wherein a Maximum-Likelihood Estimate (MLE) is derived, e.g., as described in Chen et al., "A simple and efficient estimation method for stream expression cardinalities," *Proceedings of the* 33*rd International Conference on Very Large Data Bases* (*VLDB*), 2007, which is incorporated herein by reference in its entirety. As shown in the flowchart of FIG. 5, for each data stream $\tau$, a vector is generated and stored in a hash array Y=(Y[1], . . . , Y[M])$^T$ of size M using the following method. First, at step 510, at the start of the measurement interval, all hash-array buckets are initialized with values of $\infty$. At step 520, an incoming record (i, v) is hashed to bucket h(i) using identifier i as the hash key, where h(•) is a uniform hashing function generating values from 1 to M. Next, at step 530, g(i) is computed, where g(•) is a unit-exponential random-number generator using i as its seed. It is noted that h(i) and g(i) can be computed in parallel. At step 540, the current bucket then stores the minimum value of g(i) for all records hashed to the bucket, i.e., an update of Y[h(i)] is performed using Y[h(i)] k min(Y[h(i)],g(i)). At step 550, a determination is made whether additional records exist, in which case the method returns to step 520. If, at step 550, it is determined that no additional records exist, then the method proceeds to step 560, wherein hash array Y is returned as a result. A bucket value will remain at $\infty$ if no record is hashed to the bucket. The following exemplary pseudo-code (Algorithm 2) may be used to implement, in a self-contained manner, the foregoing algorithm for generating a vector for the count query, which is executed for both data streams independently, using the same functions h(•) and g(•).

---

Algorithm 2 Online sketch generation for Count Queries

1: Initialize a hash array Y of size M with value $\infty$.
2: for each incoming data (i,v) do
3:  update Y[h(i)] = min(Y[h(i)], g(i))
4: Return Y at the end of each measurement interval.

---

It is noted that Algorithm 2 is substantially similar to Algorithm 1 discussed above, except that an update of Y[h(i)] is performed using Y[h(i)]←min(Y[h(i)],g(i)), instead of Y[h(i)]←min(Y[h(i)],g(i)/v). In the scenario of Algorithm 2, the distribution of Y[k] is a truncated exponential distribution with rate $\lambda$, which also implies that Y[k] is approximately exponential with rate $\lambda$ when $\lambda$ is large. Thus, a new Quasi-Maximum Likelihood Estimation (QMLE) method, which will be described below, can also be applied for the count query, and its performance will be similar to that of an MLE method.

To answer the average query, two hash arrays are used for each data stream, one for computing the sum query, and the other for computing the count query. The result of the average query is simply the division of the sum query by the count query. Accurately estimating the sum aggregation will be discussed in further detail below.

The details of a Quasi-Maximum Likelihood Estimation (QMLE) method for aggregation will now be discussed. Arrays (Y$_1$[k], Y$_2$[k]), k=1, . . . , M, are a pair of hash arrays that store the pseudo-random vectors applied to streams $\tau_1$ and $\tau_2$, respectively, using Algorithm 1 with the same functions h and g. The variables $\Lambda_1$, $\Lambda_2$, and $\mu$ represent the mean of the total attribute sums for records in streams $\tau_1$, $\tau_2$, and $\tau_1 \cap \tau_2$, respectively, which are hashed to an arbitrary bucket.

It is noted that $\Lambda_1$ and $\Lambda_2$ can be treated as known quantities using the total sums of attribute values in the two streams divided by M. It is further noted that Mμ is the answer to the aggregate query in Equation (1). A near-optimal statistical method for estimating μ, using $(Y_1[k], Y_2[k])$, k=1, . . . , M, will be presented below.

For simplicity, it is assumed that the attribute values in both streams $\tau_1, \tau_2$ are generated from the same unknown distribution F, with mean v and variance $\kappa v^2$. In simulation studies, it has been shown that such a simplification does not substantially alter the quality of the estimates obtained from a QMLE method.

It is noted that, in general, attribute distribution F is unknown. In statistical terms, F is a nuisance parameter for estimating μ, the parameter of interest. Since F is unknown, the exact distribution of $(Y_1[k], Y_2[k])$ is also unknown. Therefore, the usual MLE method, which is well-known to be most efficient in the statistics literature, cannot be used. However, by using a Gamma approximation, as in Equation (7), a Quasi-Maximum Likelihood Estimation (QMLE) method for estimating μ can yield a near-optimal estimate in terms of statistical efficiency.

The following additional notation will be used in the explanation below. In generating $(Y_1[k], Y_2[k])$, k=1, . . . , M, the expressions $X[k], X_1[k], X_2[k]$, k=1, . . . , M, represent vectors corresponding to streams $\tau_1 \cap \tau_2$, $\tau_1 \setminus \tau_2$, and $\tau_2 \setminus \tau_1$, respectively. Expressions $X[k], X_1[k], X_2[k]$, k=1, . . . , M, are also obtained using Algorithm 1 but are clearly unobservable. It can be seen that $$Y_i[k] = \min(X[k], X_i[k]), i=1, 2.$$

The variables $\lambda, \lambda_1, \lambda_2$ represent the average number of records hashed into each bucket, which belong to streams $\tau_1 \cap \tau_2$, $\tau_1 \setminus \tau_2$, and $\tau_2 \setminus \tau_1$, respectively. As described above, each of $X[k], X_1[k], X_2[k]$ can be approximated by a generalized-Pareto distribution when $\lambda, \lambda_1, \lambda_2$ are large. Therefore, to estimate μ, the likelihood function of $(Y_1[k], Y_2[k])$ can be derived by treating the generalized-Pareto distributions of $X[k], X_1[k], X_2[k]$ as true models, i.e., $$X \approx \text{Pareto}(\alpha, \beta), X_i \approx \text{Pareto}(\alpha_i, \beta). \quad (9)$$

Then, μ is derived using the usual MLE method. Since the assumed models in Equation (9) might not be true, such a method is referred to in the statistics literature as a "Quasi-"Maximum-Likelihood Estimation (QMLE) method. Typically, there will be a bias for a QMLE estimate, which bias will be shown below to be negligible for large values of $\lambda + \lambda_1 + \lambda_2$, and a QMLE estimate will be shown to be near-optimal in terms of statistical efficiency.

The variable $P_Q$ denotes the quasi-probability based on this Pareto-distribution assumption. The quasi-likelihood can be derived as follows. For $y_1 \geq 0, y_2 \geq 0$, the following equations are true:

$$P_Q(Y_1 \geq y_1, Y_2 \geq y_2) = P_Q(\min(X, X_1) \geq y_1, \min(X, X_2) \geq y_2)$$
$$= P_Q(X \geq \min(y_1, y_2), X_1 \geq y_1, X_2 \geq y_2)$$
$$= (1 + \beta \min(y_1, y_2))^{-\alpha}(1 + \beta y_1)^{-\alpha_1}(1 + \beta y_2)^{-\alpha_2}.$$

Thus, a quasi-density function, $P_Q(Y_1 = y_1, Y_2 = y_2)$, can be written as $$\begin{cases} \text{Case } 1 (y_1 < y_2): & \alpha_1(\alpha + \alpha_2)\beta^2(1 + \beta y_1)^{-(\alpha_1+1)} \\ & (1 + \beta y_2)^{-(\alpha+\alpha_2+1)}; \\ \text{Case } 2 (y_2 > y_1): & \alpha_1(\alpha + \alpha_2)\beta^2(1 + \beta y_1)^{-(\alpha_1+1)} \\ & (1 + \beta y_2)^{-(\alpha+\alpha_2+1)}; \\ \text{Case } 3 (y_1 = y_2): & \alpha\beta(1 + \beta y_1)^{-(\alpha+\alpha_1+\alpha_2+1)}. \end{cases} \quad (10)$$

The variable $m_i$ represents the proportion of Case i, i=1, 2, 3, in the M-obtained bucket pairs, $(Y_1[k], Y_2[k])$, k=1, . . . , M. It can be observed that, for some bucket pairs, it is possible that one or even both of the values will be ∞ if no records are hashed into one or both buckets in the pair. The expression $Y_i^*$ is defined as $Y_i^* = Y_i I(Y_i < \infty)$, i=1, 2. From Equation (8), the relations $\mu = \alpha\beta$ and $\Lambda_i = (\alpha + \alpha_i)\beta$, i=1, 2, can be derived. By using this transformation, the quasi-likelihood function can be expressed as a function of $\beta, \mu, \Lambda_1, \Lambda_2$, where $\Lambda_1, \Lambda_2$ can be treated as known quantities, as explained previously. The following Statement 1 provides the average quasi-log likelihood of the pair of hash arrays, $(Y_1[k], Y_2[k])$, k=1, . . . , M.

Statement 1:
The average quasi log-likelihood $-(\mu,\beta)$ with data $\{(Y_1[k], Y_2[k]): k=1, \ldots, M\}$ can be written as $$l_Q(\mu, \beta) = m_3 \log \mu + \sum_{i=1}^{2} m_i \log(\Lambda_i - \mu) + \quad (11)$$
$$\mu\beta^{-1} S_3(\beta) - \beta^{-1} \sum_{i=1}^{2} \Lambda_i S_i(\beta) + S_0(\beta) - \sum_{i=1}^{2} S_i(\beta) + \text{const},$$

where $Y_3^*[k] = \min(Y_1^*[k], Y_2^*[k])$ and for i=1, 2, 3.

$$S_i(\beta) = \frac{1}{M} \sum_{k=1}^{M} \log(1 + \beta Y_i^*[k]),$$

$$S_0(\beta) = \frac{1}{M} \sum_{k=1}^{M} \log(1 + \beta Y_1^*[k]) I(Y_1^*[k] = Y_2^*[k]).$$

Let $$(\hat{\mu}_Q, \hat{\beta}_Q) = \text{argmax} l_Q(\mu, \beta).$$

Figure 6:
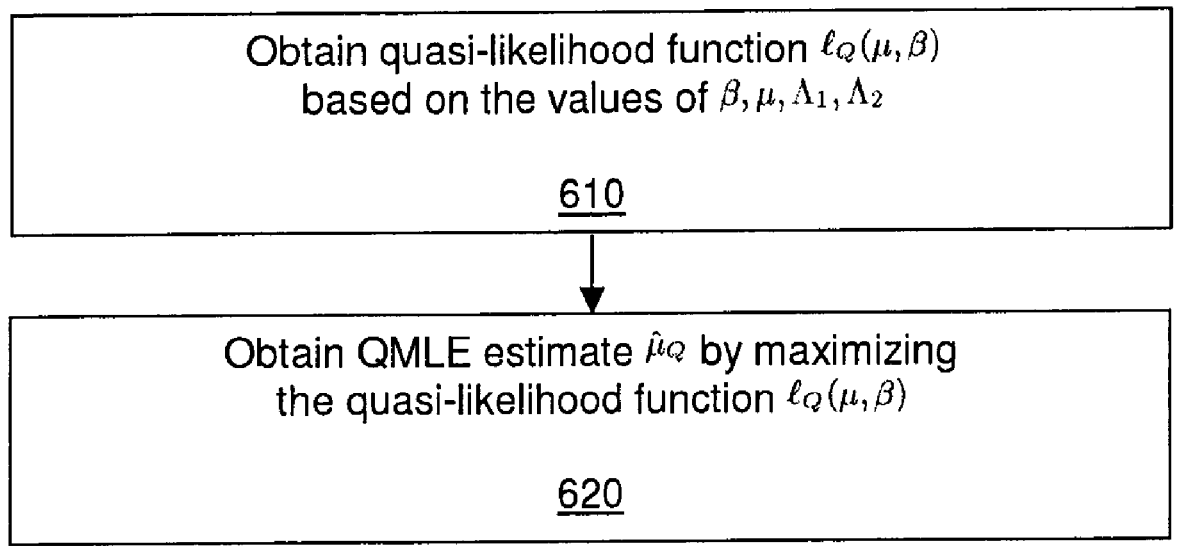
FIG. 6 is a flowchart illustrating a method for generating a QMLE estimate consistent with one embodiment of the present invention.

Therefore, as shown in FIG. 6, the quasi-likelihood function $l_Q(\mu,\beta)$ is first obtained, at step 610, using Equation (11), based on the values of $\beta, \mu, \Lambda_1, \Lambda_2$. Next, at step 620, to obtain $\hat{\mu}_Q$, which represents a QMLE estimate of μ, Newton-Rapson type algorithms (or other algorithms) are employed to maximize the quasi-likelihood function $l_Q(\mu,\beta)$.

Thus, a new Quasi-Maximum Likelihood Estimation (QMLE) method has been developed in response to an increased focus on probabilistic-query algorithms for large-volume data streams. Embodiments of the present invention further address the problem of aggregate queries, such as sum, count, and average, and provide new algorithms based on minimum statistics and quasi-likelihood inference. A QMLE method consistent with certain embodiments of the invention is near-optimal in terms of statistical efficiency. Both theoretical analysis and empirical studies have shown that, with the same memory requirement, a QMLE method has significantly superior performance relative to existing perturbation methods, particularly when noise-to-signal ratios are large. A method for monitoring bytes among a pair of network nodes by using a QMLE estimator, e.g., for the purpose of detecting network-traffic anomalies, has also been presented.

It has been demonstrated empirically that, for a pair of high-volume data streams, estimation algorithms consistent with certain embodiments of the present invention yield more accurate estimates of the aggregate queries than existing approaches, using the same amount of memory.

The terms "Quasi-Maximum Likelihood Estimation" and "QMLE" should be understood to include the particular implementations and embodiments explicitly described herein, as well as other possible implementations and embodiments.

While embodiments of the invention disclosed herein use certain methods for generating statistical vectors, as shown in FIGS. 4 and 5, it should be understood that a QMLE estimator consistent with alternative embodiments of the invention could use other methods for generating statistical vectors.

The present invention has applicability in monitoring traffic in different environments and comprising data streams of different types, including not only traditional-network (e.g., hardwired LAN) data streams, but also, e.g., wireless-network data streams, sensor-network data streams, and financial-application data streams. A QMLE scheme consistent with certain embodiments of the invention can be used to estimate both the number of bytes and the number of packets in stream expressions over a pair of individual nodes in a network.

The term "random," as used herein, should not be construed as being limited to pure random selections or number generations, but should be understood to include pseudo-random, including seed-based selections or number generations, as well as other selection or number generation methods that might simulate randomness but are not actually random, or do not even attempt to simulate randomness.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of data-storage media, such as magnetic recording media, optical recording media, solid state memory, floppy diskettes, CD-ROMs, hard drives, or any other machine-readable data-storage medium storing machine-readable program code, wherein the program code includes a set of instructions for executing one of the inventive methods on a digital data-processing machine, such as a computer, to perform the method. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A method of monitoring a network, comprising:
at each node of a set, constructing a corresponding vector of M components based on a stream of data packets received at the node during a time period, the set including a plurality of nodes of the network, M being greater than 1; and
estimating a value of a byte traffic produced by a part of the packets based on the constructed vectors, the part being the packets received by every node of the set;
wherein:
the constructing includes updating a component of the vector corresponding to one of the nodes in response to the one of the nodes receiving a data packet,
the updating includes selecting a component of the vector to be updated by hashing a property of the received data packet, and
the hashing includes (i) mapping the property of the received data packet to a first element of a first hash function having a set of first elements and (ii) mapping the property of the received data packet to a second element of a second hash function having a set of second elements, wherein the property of the received data packet is a hash key used for both the first hash function and the second hash function.

2. The method of claim 1, wherein the updating includes assigning a value to the selected component, the value depending on a number of bytes in the received data packet causing the update to the selected component.

3. The method of claim 2, wherein the constructing of the vector of M components involves updating the number assigned to each component by a process that changes the assigned number in a monotonic manner.

4. The method of claim 2, wherein the estimating involves performing a quasi-maximum likelihood estimation to obtain the value.

5. The method of claim 1, wherein the estimating involves performing a quasi-maximum likelihood estimation to obtain the value.

6. A network comprising:
a set of nodes, each node configured to construct a corresponding vector of M components based on a stream of data packets received at the node during a time period, the set including a plurality of nodes of the network, M being greater than 1; and
a server configured to (i) receive the constructed vectors from the nodes and (ii) based on the constructed vectors, estimate a value of a byte traffic produced by a part of the packets, the part being the packets received by every node of the set;
wherein:
the constructing of the vector includes updating a component of the vector corresponding to one of the nodes in response to the one of the nodes receiving a data packet,
the updating includes selecting a component of the vector to be updated by hashing a property of the received data packet, and
the hashing includes (i) mapping the property of the received data packet to a first element of a first hash function having a set of first elements and (ii) mapping the property of the received data packet to a second element of a second hash function having a set of second elements, wherein the property of the received data packet is a hash key used for both the first hash function and the second hash function.

7. The network of claim 6, wherein the updating includes assigning a value to the selected component, the value depending on a number of bytes in the received data packet causing the update to the selected component.

8. The network of claim 7, wherein the constructing of the vector of M components involves updating the number assigned to each component by a process that changes the assigned number in a monotonic manner.

9. The network of claim 7, wherein the estimating involves performing a quasi-maximum likelihood estimation to obtain the value.

10. The network of claim 6, wherein the estimating involves performing a quasi-maximum likelihood estimation to obtain the value.

11. A non-transitory digital data-storage medium encoding a machine-executable program of instructions for steps of a method of monitoring a network, the steps comprising:
at each node of a set, constructing a corresponding vector of M components based on a stream of data packets received at the node during a time period, the set including a plurality of nodes of the network, M being greater than 1; and
estimating a value of a byte traffic produced by a part of the packets based on the constructed vectors, the part being the packets received by every node of the set;
wherein:
the constructing includes updating a component of the vector corresponding to one of the nodes in response to the one of the nodes receiving a data packet,
the updating includes selecting a component of the vector to be updated by hashing a property of the received data packet, and
the hashing includes (i) mapping the property of the received data packet to a first element of a first hash function having a set of first elements and (ii) mapping the property of the received data packet to a second element of a second hash function having a set of second elements, wherein the property of the received data packet is a hash key used for both the first hash function and the second hash function.

12. The digital data-storage medium of claim 11, wherein the updating includes assigning a value to the selected component, the value depending on a number of bytes in the received data packet causing the update to the selected component.

13. The digital data-storage medium of claim 12, wherein the constructing of the vector of M components involves updating the number assigned to each component by a process that changes the assigned number in a monotonic manner.

14. The digital data-storage medium of claim 12, wherein the estimating involves performing a quasi-maximum likelihood estimation to obtain the value.

15. The digital data-storage medium of claim 11, wherein the estimating involves performing a quasi-maximum likelihood estimation to obtain the value.

16. The method of claim 1, wherein the first element is a bucket of a hash array, and the second element is a random number.

17. The method of claim 1, wherein the second hash function is independent of the first hash function.

18. The method of claim 16, wherein, for at least one data packet, the value of the bucket identified by the first hash function is updated based on the random number generated by the second hash function.

19. The network of claim 6, wherein the first element is a bucket of a hash array, and the second element is a random number.

20. The network of claim 6, wherein the second hash function is independent of the first hash function.

21. The network of claim 19, wherein, for at least one data packet, the value of the bucket identified by the first hash function is updated based on the random number generated by the second hash function.

22. The digital data-storage medium of claim 11, wherein the first element is a bucket of a hash array, and the second element is a random number.

23. The digital data-storage medium of claim 11, wherein the second hash function is independent of the first hash function.

24. The digital data-storage medium of claim 22, wherein, for at least one data packet, the value of the bucket identified by the first hash function is updated based on the random number generated by the second hash function.

* * * * *